July 24, 1934.  C. S. RICKER  1,967,515
HEAD LAMP CONTROL
Original Filed April 26, 1929  3 Sheets-Sheet 1
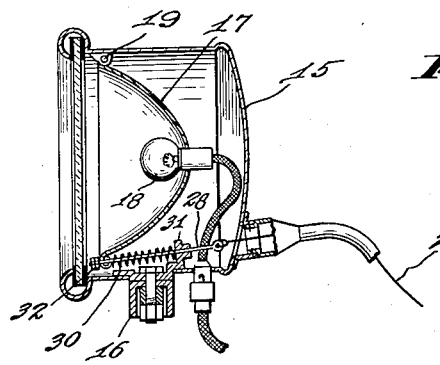
Fig.1.
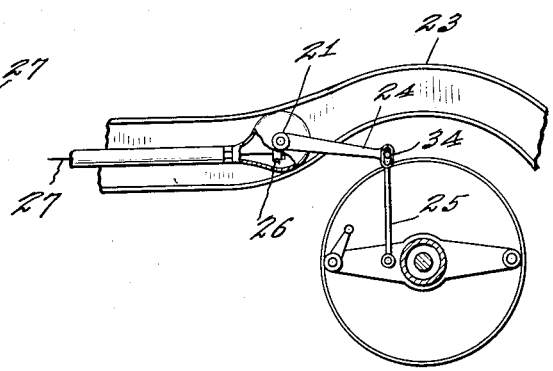
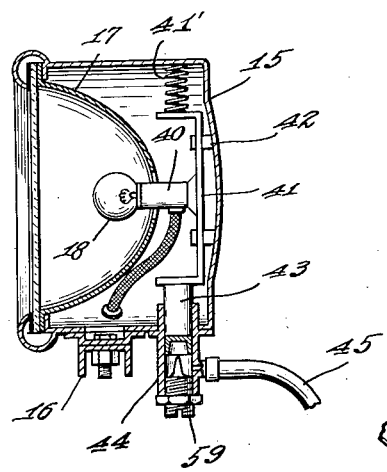
Fig.2.
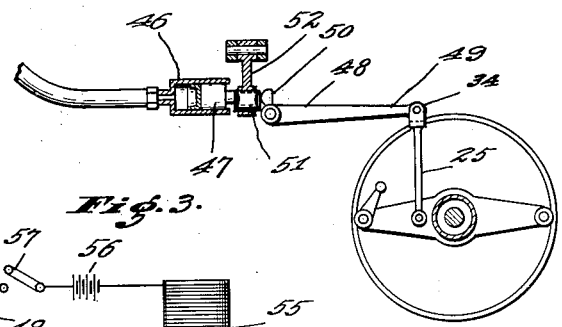
Fig.3.
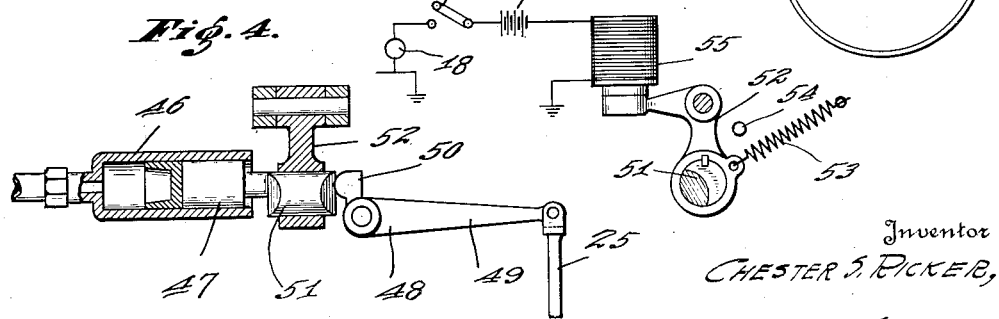
Fig.4.
Inventor
CHESTER S. RICKER,
By
Attorneys July 24, 1934.  C. S. RICKER  1,967,515
HEAD LAMP CONTROL
Original Filed April 26, 1929   3 Sheets-Sheet 2

Inventor
CHESTER S. RICKER,

By
Attorneys

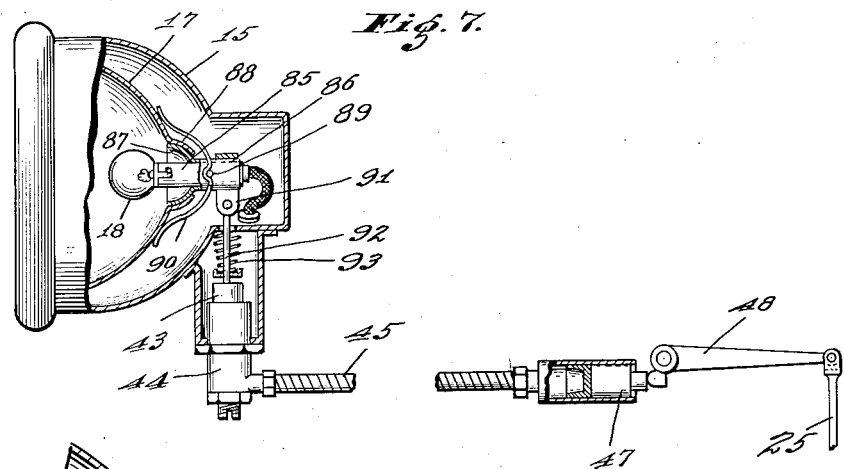
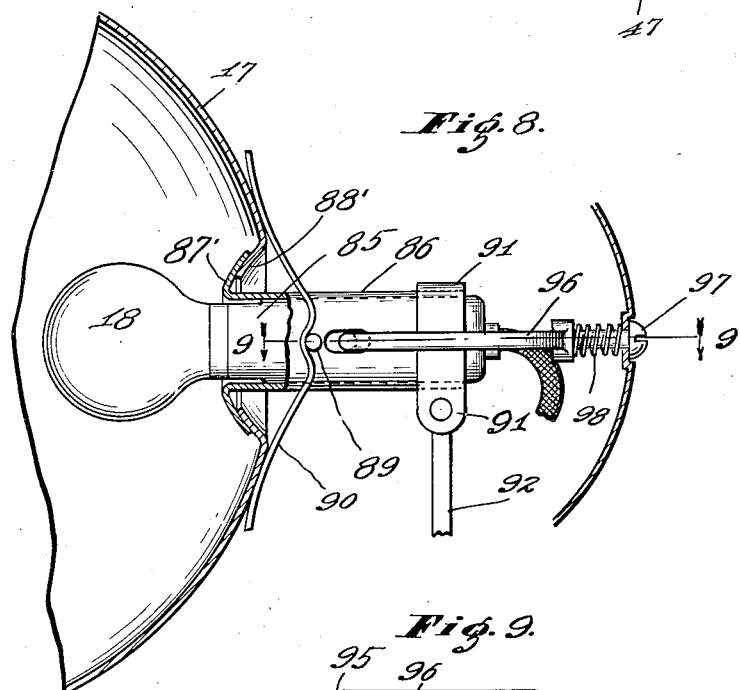
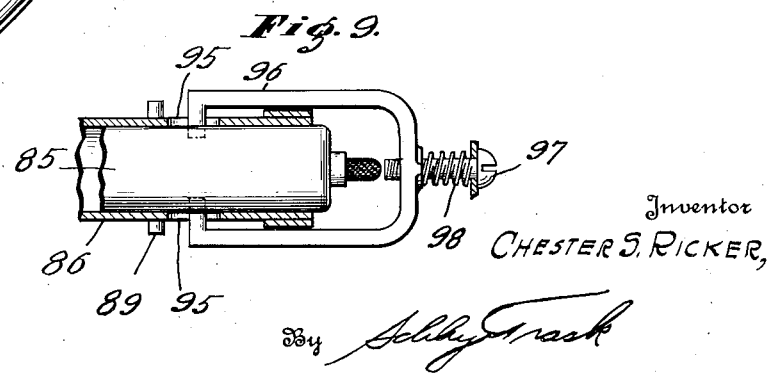

Patented July 24, 1934

1,967,515

UNITED STATES PATENT OFFICE 1,967,515

HEAD LAMP CONTROL

Chester S. Ricker, Indianapolis, Ind., assignor of one-half to Walter S. Bickford, Fairfield, Calif.

Application April 26, 1929, Serial No. 358,211
Renewed December 13, 1933

17 Claims. (Cl. 240—7.1)

As automobiles are at present manufactured, the springs are frequently so "soft" or yielding that variation in the loading of the automibile produces objectionable vertical displacement of the light-beam emitted from the automobile headlamps. For instance, with the automobile carrying only the driver, the headlamps may be adjusted to provide adequate road illumination and to avoid glare in the eyes of oncoming drivers; but when the automobile is fully loaded, the rear end of the frame thereof may be depressed to such an extent that the projected headlight beam is raised to a point where insufficient illumination of the road and glare in the eyes of oncoming drivers result. My invention is concerned with means for correcting for this effect of "soft" springs.

It is the broad object of my invention to provide a means for depressing the projected headlight beam relatively to the automobile frame as the rear end of the frame is lowered under increased load or due to spring movements on rough roads, in order that the beam pattern on the road surface may remain substantially constant irrespective of variations in the loading or spring deflections of the automobile.

There are several ways in which my objects may be accomplished. I may provide the headlamps with several different light-sources vertically spaced from each other, and take advantage of the fact that the vertical disposition of the projected light-beam is determined by the location of the light-source relative to the axis of the lamp reflector; and I may provide switching means operated by spring deflection for selectively controlling the supply of current to the different light-sources. Such a device is shown in my co-pending application Serial No. 358,212, filed April 26, 1929. On the other hand, I may vary the vertical disposition of the projected light-beam as by moving the light bulb relative to the reflector or by tilting the reflector, as I contemplate in this application. The entire lamp could be tilted to accomplish this result, but its weight makes such procedure less desirable.

Figure 5:
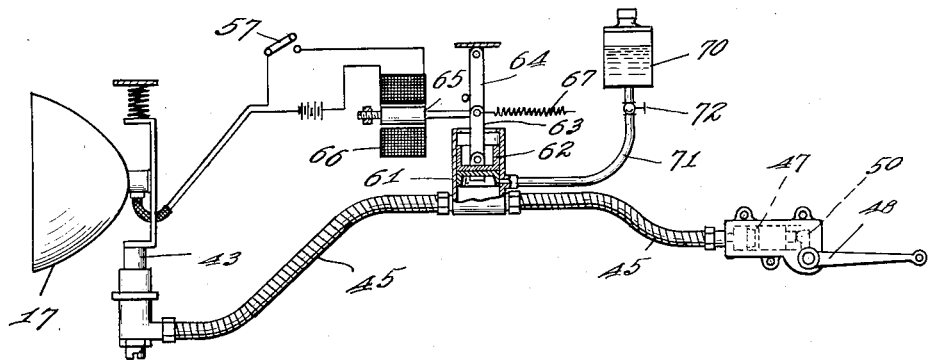
Figure 6:
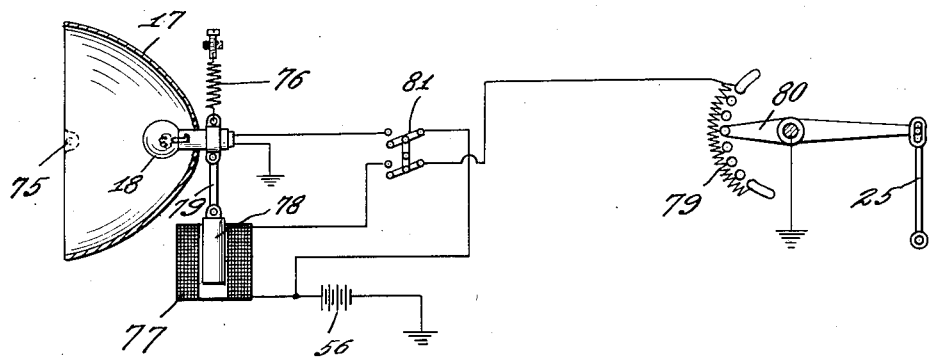
Figure 10:
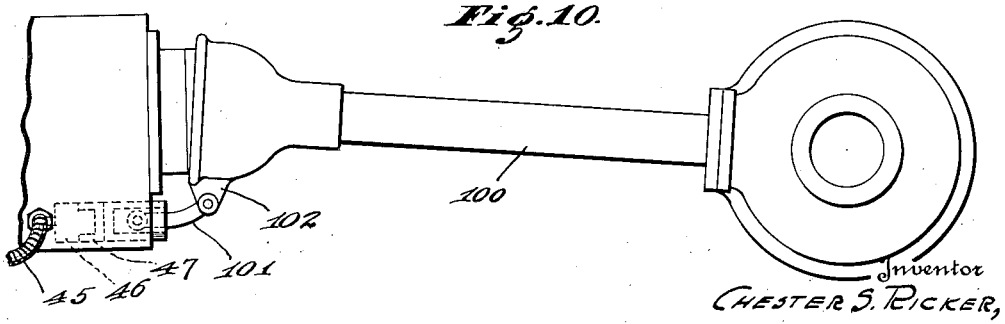

The accompanying drawings illustrate my invention: Fig. 1 is a somewhat diagrammatic view showing the headlamp in vertical section and the control means in elevation, and also showing the use of a mechanical interconnection between the headlamp and the control means; Fig. 2 is a view similar to Fig. 1 but showing a lamp-bulb arranged to move vertically relative to its associated reflector, and also showing hydraulic means for obtaining such movement of the lamp-bulb; Figs. 3 and 4 are detail views of a device which I may employ to render the bulb-moving means of Fig. 2 in-operative when the lamps are not burning; Fig. 5 is a view similar to Fig. 1 showing hydraulic control and a different form of means for rendering the bulb-moving means in-operative when the lamps are not burning; Fig. 6 is a view similar to Fig. 1 showing a tilting reflector and electrical means for tilting it; Fig. 7 illustrates a pivotally mounted, vertically movable lamp bulb actuated by hydraulic means; Fig. 8 is a fragmental view showing on a larger scale a modification of the lamp-bulb mounting illustrated in Fig. 7; Fig. 9 is a horizontal section on the line 9—9 of Fig. 8; and Fig. 10 is a side elevation of means for controlling the lamp-bulb by the position of the torque tube.

In fig. 1 the headlamp 15 is shown as mounted upon a support 16 and as provided with the usual reflector 17 and lamp-bulb 18. The reflector 17 is pivotally mounted as at 19 on a horizontal axis, the reflector being tiltable about this axis to vary the vertical disposition of the projected headlight beam. The lamp-bulb 18 is supported from the reflector and moves with it during such tilting movement.

To embody my invention in association with such a headlamp, I provide means responsive to the deflection of the frame-supporting springs of the vehicle for automatically controlling tilting of the reflector about its axis of pivotal mounting. As illustrated in Fig. 1, this control means comprises a bell crank 21 pivotally mounted on the frame 23 of the automobile near the rear axle. One arm 24 of the bell crank is connected, as by means of a link 25, with the rear axle housing or some part movable therewith, in order that the angular position of the bell crank 21 relative to the frame 23 may change when deflections of the frame-supporting springs occur. The other arm 26 of the bell crank is connected as through the Bowden wire or its equivalent 27 to a rod 28 attached to the reflector 17 near the bottom thereof in such a manner that pulling of the Bowden wire 27 by rotation of the bell crank 21 will cause the reflector 27 to tilt in a counter-clockwise direction about its axis of pivotal mounting to depress the projected light beam. A spring 30 acting between the reflector and a fixed abutment 31 opposes such movement of the reflector. Preferably, the connection between the rod 28 and the reflector 17 is made adjustable, as by the provision of the nuts 32 which are screw-threadedly mounted on the end of the rod 28 and serve as a stop against which the spring 30 forces the reflector.

In the operation of this device, the nuts 32 are adjusted to provide the desired vertical disposition of the beam emitted from the headlamp 15. Thereafter, if spring deflection causes a lowering of the rear end of the frame 23, the bell crank 21 is rotated in a counter-clockwise direction with the result that the Bowden wire 27 draws the rod 28 rearwardly causing the reflector 17 to be tilted in such a manner that the projected light beam is depressed relative to the frame. By proper arrangement of the parts, and particularly by proper proportion of the lengths of the two bell-crank arms 24 and 26, the tilting of the reflector 17 and the resultant depression of the light beam relative to the frame 23 counteracts the lowering of the rear end of the frame 23 which otherwise would raise the projected light beam.

Desirably, the mechanism interconnecting the rear axle and the reflector embodies a degree of lost motion such as would result from providing a pin-and-slot connection 34 between the link 25 and the bell-crank arm 24. Such lost-motion permits slight spring deflections to occur without producing any tilting of the projected headlight beam. To prevent the spring 30 from taking up the lost-motion in the connection 34, the spring 30 may be made of insufficient strength to overcome the friction necessary to rotate the bell crank 21 on its axis of pivotal mounting.

In the construction illustrated in Fig. 2, the headlamp is provided as before with the reflector 17 and the lamp-bulb 18. In this construction, however, the reflector is rigidly mounted in the headlamp 15, and the lamp-bulb 18 is vertically movable relative to the reflector. This vertical movement produces vertical displacement of the projected light beam, the light beam being elevated by lowering the lamp-bulb 18 and being depressed by raising the lamp-bulb.

The lamp-bulb 18 is carried in a socket 40 which projects through a vertical slot at the base of the reflector 17 and is secured to a vertically movable member 41 mounted in suitable guides 42 in the lamp housing. In Fig. 2, I have illustrated a hydraulic means for controlling the vertical position of the lamp bulb 18. To this end, I mount on the member 41 a piston 43 which extends into a cylinder 44 mounted in the lower part of the lamp housing. The interior of the cylinder 44 is connected through a suitable tube or pipe 45 with a second cylinder 46 mounted on the vehicle frame near the rear axle and having within it a piston 47. With the cylinders 44 and 46 and the pipe 45 filled with a suitable liquid, the piston 47 may be moved to raise and lower the lamp-bulb 18. Desirably, I provide a spring 41' which acts on the member 41 and tends to force the piston 43 inwardly in its associated cylinder.

The mechanism employed to move the piston 47 may take any form desired. I have shown this mechanism as comprising a bell crank 48 having a relatively long arm 49 connected through the link 25 with the rear axle housing or some part movable therewith. The short arm 50 of the bell crank 48 operates the piston 47, desirably through a push rod or member 51 carried in a movable support 52. By moving this support 52 to carry the push rod 51 out of line with the short bell-crank arm 50 and the piston 47 when the lamp-bulb is not burning, the connection between the bell crank 48 and the lamp-bulb supporting member 41 is broken, and spring deflections may occur without moving the lamp-bulb. I am thereby enabled to save wear on the lamp-bulb moving mechanism.

Preferably, movement of the member 52 is effected under the control of the switch which controls the supply of current to the lamp-bulb 18, one arrangement for accomplishing this result being illustrated in Fig. 3. In such arrangement, the member 52 is pivotally mounted in such a manner that it may swing to carry the push rod 51 into or out of line with the piston 47. A spring 53 tends normally to hold the member 52 against a suitable abutment 54 with the push rod 51 out of line with the piston 47, and an electro-magnet 55 is provided for swinging the member 52 into such a position that the push rod 51 will be in line with the piston 47. The electro-magnet 55 may be connected in the same circuit with the battery 56, light-control switch 57, and the lamp-bulb 18, so that when the switch 57 is closed to light the lamp-bulb 18 the resultant energization of the magnet 55 will move the push rod 51 into line with the piston 47 and permit the vertical position of the lamp-bulb 18 to be under control of the bell-crank 48. The end faces of the push rod may be beveled to facilitate its introduction between the piston 47 and the bell-crank arm 50.

The device just described operates in substantially the same manner as that shown in Fig. 1, except that, as shown, the connection between the long arm of the bell-crank and the link 25 is not a lost-motion connection. When the switch 57 is closed, the lamp-bulb 18 is illuminated and the push rod 51 is in position to effect a connection between the bell crank 48 and the piston 47. When the rear springs of the vehicle are deflected downwardly, the bell-crank 48 rotates in a counter-clockwise direction and forces the piston 47 inwardly. This action causes an upward movement of the piston 43 and of the lamp-bulb 18, and produces a corresponding depression of the projected light-beam.

In the device illustrated in Fig. 2, the lower end of the cylinder 44 may be closed with an adjustable screw 59, which may be adjusted to vary the normal position of the lamp-bulb 18.

In Fig. 5, I have illustrated a device very similar to that shown in Fig. 2 except that I employ a different means for rendering the control mechanism inoperative to move the lamp-bulb when the light switch 57 is open. In this device, I provide in the pipe or tube 45 an auxiliary cylinder 61 having movable within it a piston 62. When this piston is at the inward limit of its movement in the cylinder 61 as shown, the lamp bulb 18 is under the control of the bell crank 48; but if the piston 62 is moved outwardly in the cylinder 61, the two pistons 43 and 47 are drawn inwardly to the limit of movement in their respective cylinders, and the bell-crank 48 can swing about its axis of pivotal mounting without producing any movement of the lamp bulb 18, for the piston 47 will be out of engagement with the bell-crank arm 50.

Movement of the piston 62 in the cylinder 61 may conveniently be under the control of the light switch 57. To accomplish this, I may attach the piston 62 to one end of a toggle joint formed by two links 63 and 64, the other end of this toggle joint being secured to some stationary point. The intermediate point of the toggle joint is connected to the core 65 of a solenoid 66 in the lamp circuit. A spring 67, also acting at the mid-point of the toggle joint opposes movement of the core 65 into the solenoid 66. In this construction, when the switch 57 is open, the solenoid 66 is not energized, and the spring 67 breaks the toggle and raises the piston 62 in the cylinder 61 to withdraw the piston 47 from engagement with the bell-crank arm 50, thus permitting the bell crank to move without producing movement of the lamp-bulb 18. When the light switch 57 is closed, however, the resultant energization of the solenoid 66 causes the core 65 to move inwardly and brings the two links 63 and 64 into line with each other, thus lowering the piston 62 to the position shown in Fig. 5 and forcing the piston 47 outwardly into engagement with the bell-crank arm 50. Thereafter, so long as the switch 57 remains closed, the vertical position of the lamp bulb 18 will be under control of the bell crank 48.

In this device, I may embody means for replenishing liquid which may be lost from the pipe 45 or any of the cylinders with which it is connected. To this end, I may provide a supply reservoir 70 connected by a pipe 71 with the cylinder 61, the opening through which communication with the cylinder 61 is effected being arranged in such a manner that it will be closed by the piston 62 when such piston is in its lower position. A hand-operated valve 72 in the pipe 71 enables the operator to replace any liquid which has escaped from the pipe 45 or from the cylinders with which it is connected.

Instead of employing a hydraulic or mechanical mechanism for controlling the vertical disposition of the projected light beam, I may employ electrical mechanism such for example as is illustrated in Fig. 6. In this device, the reflector 17 is pivotally mounted as at 75, the lamp-bulb 18 being mounted to move with the reflector. The angular position of the reflector 17 about its axis of pivotal mounting is under the joint control of a spring 76 and a solenoid 77 the core 78 of which is connected through a link 79 with some convenient point on the reflector.

The solenoid 77 is in circuit with the battery 56 and a rheostat 79 the movable arm 80 of which is connected to the link 25 previously described. Desirably, the lamp circuit and the solenoid circuit are under the joint control of a switch 81. In such a device, when the switch 81 is closed, the lamp-bulb 18 is burning, and the angular position of the reflector 17 is under the joint control of the spring 76 and the solenoid 77. When the rear end of the vehicle frame is depressed, the arm 80 of the rheostat is moved to increase the effective resistance thereof, the current flowing through the solenoid 77 is reduced, and the spring 76 operates to rotate the reflector 17 in the counter-clockwise direction, thus causing a depression of the headlight beam. Should the load carried by the vehicle be decreased, the resistance of the rheostat 79 is decreased. The resultant increase in the current flowing through the solenoid 77 draws the rear end of the reflector 17 downwardly and elevates the light beam relative to the frame, thus counteracting for that movement of the frame which otherwise would depress the light beam.

In Figs. 7, 8, and 9, I have illustrated another form of means for controlling the vertical disposition of the projected headlight beam. In this construction I move the lamp bulb 18 vertically by rocking it about an axis displaced from its filament. This rocking movement is shown as being under the control of hydraulic mechanism such as is illustrated in Fig. 2 or Fig. 5. The socket 85 of the lamp bulb 18 is mounted in a sleeve 86 which extends through the reflector at the base thereof and is provided inside of the reflector with an annular flange 87 in the form of a spherical segment. The base of the reflector 17 is formed to provide a complementary flange 88 which supports the flange 87. Outside the reflector 17 I provide the sleeve 86 with a cross pin 89 against which there bears the mid point of a leaf spring 90 the ends of which bear against the outer surface of the reflector 17 to maintain the spherical flanges 87 and 88 in contact with each other.

Near the outer end of the sleeve 86, I mount a collar 91 connected through a rod 92 with the pistons 43 of the cylinder 44. A spring 93 tends to force the piston 43 downwardly in its associated cylinder.

In the operation of this device, the movement of the bell-crank 48 which results from spring deflection is transmitted to the piston 43, and movement of the piston rocks the lamp bulb 18 together with its socket 85 and the sleeve 86 in a vertical plane about the center of the spherical flanges 87 and 88. When the rear end of the vehicle frame is lowered, thus creating a tendency to elevate the headlight beam, the bell-crank 48 moves in a counter-clockwise direction about its axis of pivotal mounting, and the spring 93 is enable to force the piston 43 and rod 92 downwardly. The resultant rocking of the lamp-bulb 18 and its supporting parts raises the lamp-bulb and depresses the projected headlight beam, as in the constructions previously described.

The lamp-bulb mounting illustrated in Fig. 7 is of the fixed-focus type. If it desired to provide a focusing adjustment, I may employ the construction illustrated in Fig. 8. Here, the sleeve 86 and the reflector 17 are provided respectively with the complementary spherical flanges 87' and 88', these flanges in this instance being arranged with their center outside the reflector 17. Close to the center of the spherical flanges 87' and 88', there are diametrically opposite slots 95 in the tube 86, and extending through these slots are the ends of a yoke 96 which are received in holes in the socket 85. The yoke 96 projects rearwardly beyond the end of the socket 85 and tube 86 and receives the screw-threaded portion of a focusing screw 97 which extends through the rear wall of the lamp casing. A spring 98 operates between the yoke 96 and the rear wall of the lamp housing to hold the head of the screw 97 in contact with the outer surface of such housing-wall.

This device operates in substantially the same manner as that shown in Fig. 7 with the addition that the position of the lamp bulb 18 axially of the reflector 17 may be adjusted by the adjusting screw 97.

In Fig. 10 I have illustrated a device whereby the vertical position of the headlight beam is determined from the position of the torque tube of the automobile. In this arrangement, the cylinder 46 is arranged near the front end of the torque tube 100, and the piston 47 is connected through a link 101 to a boss 102 mounted on the forward end of the torque tube. There may be two of the cylinders 46, each having its associated piston 47 connected to the torque tube, and communicating through the pipe 45 with the cylinder 44 of one of the headlamps. Or, if desired, there may be a single cylinder 46 to which both of the pipes 45 are connected.

As shown in Fig. 10, the cylinder 46 is located below the axis about which the torque tube swings, so that the piston 47 moves inwardly in the cylinder 46 when the rear axle of the automobile moves downwardly relative to the frame, as is the case in the construction shown in Fig. 7; and a bulb-moving mechanism such as is shown in Fig. 7 may therefore be used in connection with the arrangement illustrated in Fig. 10. If the bulb-moving means is of the form shown in Figs. 2 and 5, where pressure in the hydraulic line raises the lamp-bulb 18, the cylinder 46 should be mounted above the axis about which the torque tube swings.

While I have shown hydraulic means used to secure movement of the lamp-bulb only relative to the reflector, it is evident that such means could be used to tilt the reflector of Figs. 1 and 6. Similarly, mechanical or electrical means could be employed to move the lamp bulb relative to the reflector.

In this application, as well as in my co-pending application Serial No. 358,212, filed Apr. 26, 1929, I have attempted to illustrate only a few of many arrangements suitable for accomplishing my broad object of automatically controlling the vertical disposition of the projected headlight beam in accordance with the amount of spring deflection in the vehicle.

I claim as my invention:—

1. In combination with a vehicle having an axle and a frame spring-supported therefrom, a headlamp carried from said frame, a reflector and lamp-bulb for said headlamp, said lamp-bulb being movable relatively to said reflector to vary the vertical disposition of the projected light-beam relative to said frame, and means associated with said axle and frame operated by vertical movement of said frame in relation to the axle for so moving said light-bulb.

2. In combination with a vehicle having an axle and a frame spring-supported therefrom, a headlamp carried from said frame, a reflector and lamp-bulb for said headlamp, said lamp-bulb being movable to vary the vertical disposition of the projected light-beam relative to said frame, and means associated with said axle and frame operated by vertical movement of said frame in relation to the axle for so moving said light-bulb.

3. In combination with a vehicle having two parts comprising an axle and a frame spring-supported therefrom, an arm pivotally mounted on one of said parts and operatively connected to the other through a lost-motion connection, a headlamp supported from said frame, a lamp-bulb for said headlamp, said lamp-bulb being movable to vary the vertical disposition of the projected light-beam relative to said frame, and means operated by movement of said arm for so moving said lamp-bulb.

4. In combination with a vehicle having two parts comprising an axle and a frame spring-supported therefrom, an arm pivotally mounted on one of said parts and operatively connected to the other, a headlamp supported from said frame, a lamp-bulb for said headlamp, said lamp-bulb being movable to vary the vertical disposition of the projected light-beam relative to said frame, and means operated by movement of said arm for so moving said lamp-bulb.

5. In combination with a vehicle having an axle and a frame spring-supported therefrom, a headlamp for said vehicle, and automatic means associated with said frame and axle and operated by relative vertical movement of said frame and axle for maintaining substantially constant the vertical disposition of the light beam projected from said headlamp when the relative position of said frame and axle varies.

6. In combination with a vehicle having an axle and a frame spring-supported therefrom, a headlamp for said vehicle, and automatic means associated with said frame and axle and operative, upon downward movement of said frame relative to said axle, to depress the light-beam projected from said headlamp relative to said frame.

7. In combination with a vehicle having front and rear axles and a frame supported therefrom, a headlamp for said vehicle, and means associated with said frame and said rear axle and operated by relative vertical movement of said frame and rear axle for maintaining substantially constant the vertical disposition of the light beam projected from said headlamp when the relative position of said frame and axle varies.

8. In combination with a vehicle having front and rear axles and a frame supported therefrom, a headlamp for said vehicle, and means associated with said frame and said rear axle and operative, when the rear end of said frame is lowered relative to said axle, to depress the light-beam projected from said headlamp relative to said frame.

9. In combination with a vehicle having an axle and a frame spring-supported therefrom, a headlamp carried from said frame, a reflector and lamp-bulb for said headlamp, said lamp-bulb being movable to vary the vertical disposition of the projected light-beam relative to said frame, and means associated with said frame and axle for moving said light-bulb to cause depression of such light-beam when said axle and frame move vertically toward each other.

10. In combination with a vehicle having an axle and a frame spring-supported therefrom, two members respectively connected to said axle and frame, a headlamp carried from said frame, a reflector and lamp-bulb for said headlamp, said lamp-bulb being movable relatively to said reflector to vary the vertical disposition of the projected light-beam relative to said frame, and means controlled by relative movement of said members for so moving said light-bulb.

11. In combination with a vehicle having an axle and a frame spring-supported therefrom, two members respectively connected to said axle and frame, a headlamp carried from said frame, a reflector and lamp-bulb for said headlamp, said lamp-bulb and reflector being movable as a unit to vary the vertical disposition of the projected light-beam relative to said frame, and means controlled by relative movement of said members for so moving said light-bulb.

12. In combination with a vehicle having an axle and a frame spring-supported therefrom, a headlamp for said vehicle, mechanism for varying the vertical disposition of the light-beam projected from said headlamp, control means responsive to relative movement of said frame and axle, and operative connections between said control means and said mechanism for depressing the light-beam relative to said frame when the rear end of said frame is lowered relative to the surface on which the vehicle rests.

13. In combination with a vehicle having an axle and a frame spring-supported therefrom, two co-operating members respectively connected to said axle and frame, a headlamp for said vehicle, and means operated in response to relative vertical movement of said members for maintaining substantially constant the vertical disposition of the light-beam projected from said headlamp when the relative position of said frame and axle varies.

14. In combination with a vehicle having a wheel-supported frame, a headlamp for said vehicle, mechanism for varying the vertical disposition of the light-beam projected from said headlamp, control means responsive to vertical movement of the rear end of said frame relative to the surface on which the vehicle rests, and connections between said control means and said mechanism for automatically depressing the light-beam when the rear end of said frame is lowered.

15. In a vehicle having front and rear supporting axles and a flexible support interposed between the axles and the body of the vehicle, a light projector on the vehicle and pivotally supported to swing in a vertical plane, and means connecting the light projector with one of the axles and actuated by movement of the body to or away from the axles to transmit movement to the light projector about its pivotal support.

16. In a vehicle having front and rear supporting axles and a flexible support interposed between the rear axle and the body of the vehicle, a light projector on the vehicle and pivotally supported to swing in a vertical plane, and means connecting the light projector with one of the axles and actuated by movement of the body to or away from the rear axle to transmit movement to the light projector about its pivotal support.

17. The combination in a vehicle having a body and wheels and a resilient support between the body and wheels to permit vertical movement of the body with relation to the wheels, of a light projector pivotally mounted on the body, and mechanism connecting the body and wheels whereby vertical movement of the body is transmitted to swing the light projector on its pivot whereby a beam of light projected by the light projector is automatically maintained in a substantially predetermined position.

CHESTER S. RICKER.